United States Patent [19]
Byrom

[11] 3,869,137
[45] Mar. 4, 1975

[54] PORTABLE STORAGE CART
[76] Inventor: Raymond R. Byrom, Rt. 1, Cleveland, Okla. 74020
[22] Filed: Aug. 17, 1973
[21] Appl. No.: 389,144

[52] U.S. Cl............................ 280/47.19, 280/47.35
[51] Int. Cl............................................. B62b 1/16
[58] Field of Search......... 280/47.19, 47.35, DIG. 6; 211/14, 60 R, 68; 188/19, 31

[56] References Cited
UNITED STATES PATENTS
| | | | |
|---|---|---|---|
| 1,418,093 | 5/1922 | Parmater | 280/DIG. 6 |
| 2,520,226 | 8/1950 | Smith | 280/47.19 X |
| 3,690,415 | 9/1972 | Nordskog | 188/31 X |

Primary Examiner—Lloyd L. King
Assistant Examiner—Gene A. Church
Attorney, Agent, or Firm—Arthur L. Wade

[57] ABSTRACT

A wheeled hand cart has racks as an integral part of the body of the cart. Various classes of equipment items are mounted on the racks so the items may be readily retrieved for use in a desired sequence.

5 Claims, 4 Drawing Figures

PATENTED MAR 4 1975

3,869,137

ND,137

PORTABLE STORAGE CART

BACKGROUND OF THE INVENTION

1. Field of the Invention

The present invention relates to a hand cart for articles of varying sizes. More particularly, the invention relates to a cart arranged to separately rack the various pieces of equipment used in athletic games such as baseball.

2. Description of the Prior Art

It has long been a general custom for athletic teams to carry the individual pieces of equipment for their players in large duffel bags. The bags are dumped into trucks or station wagons, transported to the playing area and thrown to the ground.

In the case of baseball, the initial batting practice demands use of the balls. Being the smaller of the equipment, the balls have migrated to the bottom of the bag from where they are the hardest item to retrieve. Usually, all the equipment is dumped from the bag to get at the balls on the bottom.

All of the foregoing handling of the equipment damages some of it. Helmets are tough, but the buffeting they take among bats and balls often damage this expensive equipment. What is needed is a structure which will separately rack the various classes of equipment in storage, which can be readily transported and from which the equipment can be individually removed for use.

SUMMARY OF THE INVENTION

A principal object of the invention is to hold articles in a storage position on a hand cart.

Another object is to hold articles in storage so they may be selectively and separately removed for use.

Another object is to make the storage cart manually portable and adapted for ready transport in a automotive conveyance.

The invention is embodied in a hand cart having wheels and a handle by which it can be manually moved to desired locations. The cart includes a framework which supports the various articles of equipment used in athletic games such as baseball. The articles are mounted on separate racks of the framework from which they can be removed without interference with that equipment remaining on its racks. The complete cart can be manually lifted into a conveyance for long distance transport and the wheels locked so the cart will not shift position.

Other objects, advantages and features of this invention will become apparent to one skilled in the art upon consideration of the written specification, appended claims, and attached drawings, wherein;

DESCRIPTION OF THE PREFERRED EMBODIMENT

Figure 1:
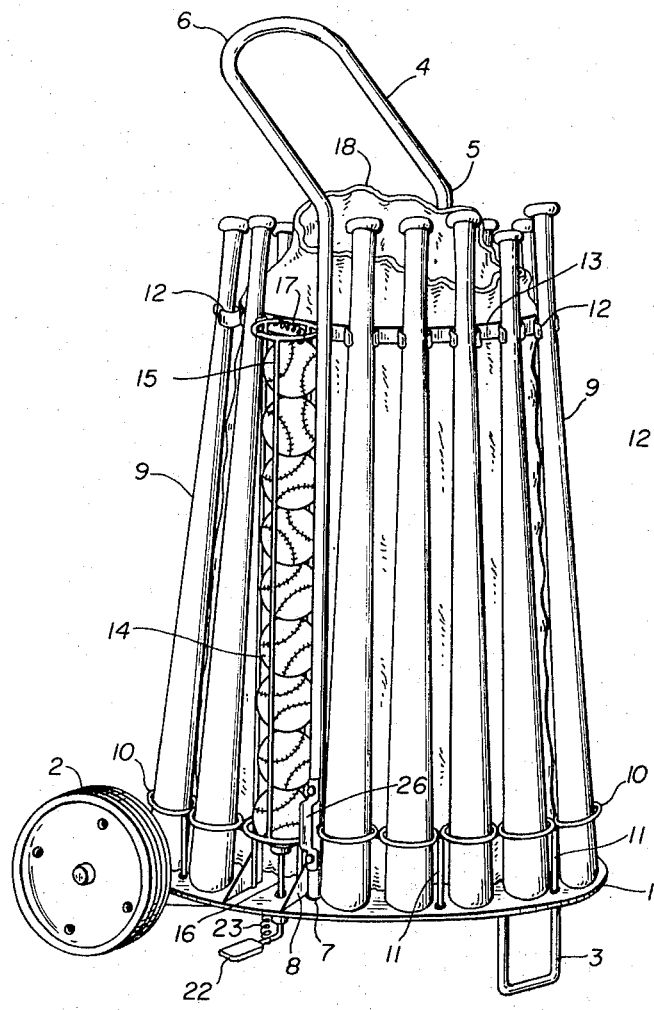
FIG. 1 is an elevation in perspective of a cart with baseball equipment stored in racks on the cart framework and embodying the present invention.

Referring to FIG. 1 there is shown a general, overall view of the cart in which the invention is embodied. The base of the cart is a platform 1 which is shown in the form of a flat plate. Wheels are mounted on the underside of platform 1. One of the wheels, wheel 2, is viewed in FIG. 1.

A stand-support 3 is shown, also attached to the underside of platform 1. With wheels and stand 3 on the ground, as shown in FIG. 1, platform 1 is held parallel to the ground. So positioned, platform 1 becomes a stable, solid base on which equipment-holding racks are mounted.

Handle 4 is readily formed from a length of pipe. First bent into a U-shape, the top of the U-shape is bent at 5 to an angle. The cart can be tipped onto its side, from its wheels, and the bent down end 6 of the handle grounded to support the cart in a horizontal position.

The lower ends 7 of the handle 4 are attached firmly to the upper surface of platform 1. This end connection may be reinforced in many suitable ways. Brace 8 is an example of structure which will reinforce the attachment. From end 7, handle 4 extends vertically to 5 as a strong element of a framework formed on the upper side of platform 1.

The form of cart disclosed is adapted to rack and store articles of athletic equipment. Specifically, baseball equipment is racked and stored so it may be readily removed as desired. In FIG. 1 bats 9 are clipped to the outside of the framework.

The lower end of bats 9 are inserted down into rings 10. These rings 10 are welded in a chain. This chain is connected to handle 4 as a support and braced along its length, as required, for strength. Braces 11 represent forms of braces which will keep the chain of rings 10 extended horizontally, parallel the upper surface of platform 1 and rigid enough to securely hold the lower ends of bats 9.

The upper ends of bats 9 are held by clips 12. These clips 12 are mounted on a ring 13 which is connected firmly to handle 4. All of the connections between handle, ring and clips are made strong enough to hold the upper end of bats 9 firmly in their lower rings 10. From their storage positions shown, these bats 9 can be readily removed as needed and replaced when not in use.

The balls 14 give another problem of storage and removal. Tubular frame 15 is formed of rings and elongated rods as disclosed. At appropriate places, this frame is fixed to the handle 4, ring 13 and rings 10 with connections strong enough to make the complete rack structure rigid and able to withstand the expected usage without distrotion of the parts of the frame.

Balls 14 dropped down tubular framework 15 are supported from their lower end by pin 16 extending up through a hole in the platform 1. This pin may be lowered. When it is lowered far enough the balls 14 can escape from the lower end of tubular frame 15.

When the cart is placed on its side, held horizontally, the balls 14 must be retained from falling out of the upper end of frame 15. Various forms of retaining means could be used. One such form, as representative of many satisfactory forms, is the spring 17 shown as extended and anchored across the upper entrance of the frame 15. Balls 14 can be pushed past the spring, or the spring unhooked from one end. When the spring is in the position shown in the drawing the balls are retained in the frame 15.

Figure 2:
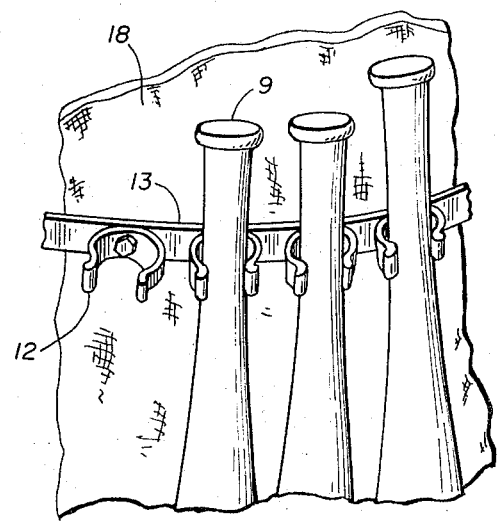
FIG. 2 is an elevation in perspective of a fragment of FIG. 1 showing how the ball bats are held at their upper ends on the racks of the cart.

Equipment other than balls and bats required storage. A duffle bag 18 is sized to fit down into ring 13 and the chain of rings 10 to rest on the upper surface of platform 1. This bag 18 may be given some support from fasteners which also hold clips 12 in place on ring 13. FIG. 2 gives some disclosure of how the side of bag 18 is clamped on the inner side of ring 13 by the same bolts holding clips 12 in place.

All sorts of equipment may be carried in bag 18. Helments, shin guards, chest protectors, etc. may be dropped into bag 18. However, bats 9 and balls 14 are racked on the outside of the framework for the bag. From their outside storage, the balls and bats can be readily removed for use without disturbing the equipment stored in bag 18.

Figure 3:
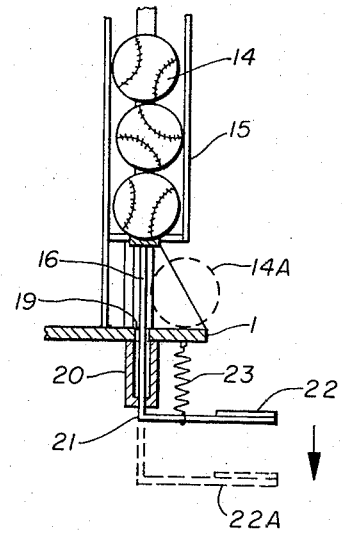
FIG. 3 is a partially sectioned elevation of details of the release mechanism for balls in their rack.

A further word is desirable on the release of balls 14. FIG. 3 discloses pin 16 extended up through hole 19 in platform 1. The pin 16 may be given additional guidence and support by tube 20 on the underside of platform 1.

Various arrangements are possible, other than the one shown. However, pin 16 can be given a simple angle at 21 so it will extend to form a lever member 22. Lever 22 is extended out so it may be engaged by a foot and pressed down to lower the upper end of pin 16. Lowered far enough, pin 16 will release balls 14 from frame 15 as indicated by ball 14A shown in dashed line. The lower position of lever 22 is also shown in dashed line at 22A. A spring 23 is arranged to urge pin 16 - lever 22 to their upward positions shown. An operator simply over comes the force of this spring 23 by depressing lever 22 and releasing balls 14 as desired.

Figure 4:
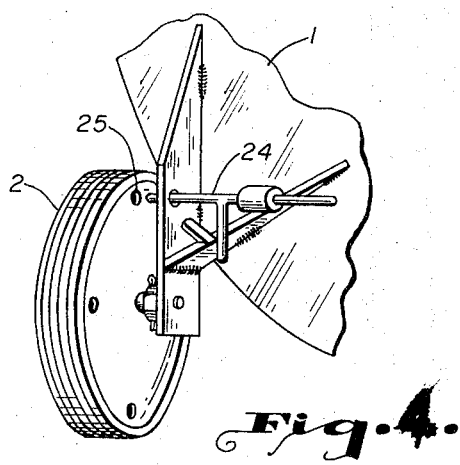
FIG. 4 is an elevation of the wheel mounting on the under side of the platform of the cart.

FIG. 4 shows the support structure for wheel 2 on the underside of platform 1. Various structures could be formed for support of these wheels. FIG. 4 shows one such form. However formed, the support structure can readily be arranged to mount a pin 24 so it can be projected into a hole 25. When the cart is tipped into its horizontal position and the wheels locked by pin 24 it will not shift in position. This stability is particularly desirable when the horizontal cart is lifted by handles 26 into the back of a station wagon or truck and driven to and from a playing field.

The cart-rack disclosed is a very convenient portable storage unit for team equipment. Not only does it allow a team coach to get his team into action quickly, with their equipment, but it reduces injury to the equipment. The items needed first are readily available. The items needing protection are stored in the centrally located bag. When all items are stored in, or on, their racks the entire assembly may be transported any distance in the rear of a truck or station wagon.

From the foregoing, it will be seen that this invention is one well adapted to attain all of the ends and objects herein above set forth, together with other advantages which are obvious and inherent to the apparatus.

It is to be understood that certain features and subcombinations are of utility and may be employed without reference to other features and subcombinations. All of this is is contemplated by and is within the scope of the invention.

As many possible embodiments may be made of the invention without departing from the scope thereof, it is to be understood that all matter herein set forth or shown in the accompanying drawings is to be interpretated in an illustrative and not in a limited sense.

The invention, having been described, what is claimed is:

1. A combination carrier and storage cart for athletic equipment such as used in baseball, including,
   a platform extended in a horizontal plane,
   wheels mounted on the lower side of the platform by means of which the platform may be manually moved from place to place,
   a handle mounted on the upper side of the platform to extend vertically,
   a basic framework attached to the handle and platform and arranged to provide a cylindrical volume above the platform for storing articles of equipment,
   brackets mounted on the outside of the framework for releasable securing elongated articles of equipment such as ball bats,
   a storing framework comprised of rings spaced from each other with elongated rods attached to the rings in forming an open tubular retaining structure for balls which are in view the length of the framework,
   and means mounted on the storing framework for the balls arranged for manually controlled release of the balls from storage.

2. The cart of claim 1 in which,
   the platform is in the form of a flat plate, and
   the basic framework includes a series of horizontal rings attached to each other at their rims as the lower portion of the framework and a series of clips at the upper portion of the framework to receive and hold baseball bats whose lower ends are inserted in the horizontal rings in storage.

3. The cart of claim 1 in which,
   the tubular framework in which balls are stored has a retention latch at the upper end of the framework to keep the balls from spilling out of the top of the framework and a release latch at the lower end of the framework which is manually operable to selectively discharge balls from the tubular framework.

4. The cart of claim 1 in which,
   a latch is mounted on the bottom of the platform arranged to engage and hold a wheel and thereby prevent the cart from rolling when the latch is set.

5. The cart of claim 1 including,
   a bag sized to fit down into the cylindrical volume provided by the basic framework and attached to the basic framework to keep the bag in place.

* * * * *